Aug. 30, 1932.  E. O. BARSTOW ET AL  1,874,692

MANUFACTURE OF HYDROCHLORIC ACID

Filed Oct. 4, 1929

INVENTORS
Edwin O. Barstow and
BY Sheldon B. Heath
Thomas Griswold, Jr.
ATTORNEY Patented Aug. 30, 1932

1,874,692

UNITED STATES PATENT OFFICE

EDWIN O. BARSTOW AND SHELDON B. HEATH, OF MIDLAND, MICHIGAN, ASSIGNORS TO THE DOW CHEMICAL COMPANY, OF MIDLAND, MICHIGAN, A CORPORATION OF MICHIGAN

MANUFACTURE OF HYDROCHLORIC ACID

Application filed October 4, 1929. Serial No. 397,252.

This invention relates to the manufacture of hydrochloric acid and has particular regard to a process involving the combustion of a carbonaceous material in the presence of chlorine and water vapor.

In a copending application, Serial No. 397,197, filed October 14, 1929, we have disclosed broadly a process for the manufacture of hydrochloric acid which consists in reacting chlorine and water vapor at a temperature between about 900° and 1500° C. in accordance with the equation;

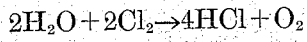
$$2H_2O + 2Cl_2 \rightarrow 4HCl + O_2$$

In the aforesaid application specific reference is made to a process wherein the reacting gases are brought together in a heated reaction zone but out of direct contact with the hot gases of combustion which are employed for producing the degree of temperature requisite for the reaction. The present application describes a mode of procedure wherein the reacting gases are intermixed with the combustion gases, the combustion of the fuel and the formation of hydrochloric acid taking place together simultaneously.

Generally speaking, the process of the present invention is carried out by introducing chlorine and water vapor directly into the combustion zone wherein the fuel is being burnt and then absorbing hydrochloric acid from the exit gases. When a liquid or gaseous hydrocarbon material, such as petroleum or natural gas, is utilized the combustion of the hydrogen constituent thereof furnishes at least a portion of the water required to react with the chlorine present. Likewise, when a combustible gaseous mixture containing free hydrogen, such as water gas, is burnt, the water formed by the oxidation of hydrogen is available for reaction with the chlorine. If a carbonaceous fuel containing little or no hydrogen, such as powdered coal, is used practically all of the water vapor required is to be introduced as such into the combustion zone. The function of the fuel consumed in the process is primarily to supply the heat required to maintain the temperature of the reaction, sufficient air or oxygen being introduced therewith to effect the complete oxidation thereof. Under best operating conditions an excess of oxygen is always present during the reaction. It is also essential for complete conversion of chlorine to hydrochloric acid, at least at the temperatures contemplated herein, that an excess of water vapor be employed, preferably as much as 100 to 200 per cent excess.

In the annexed drawing:—

Figure 1:
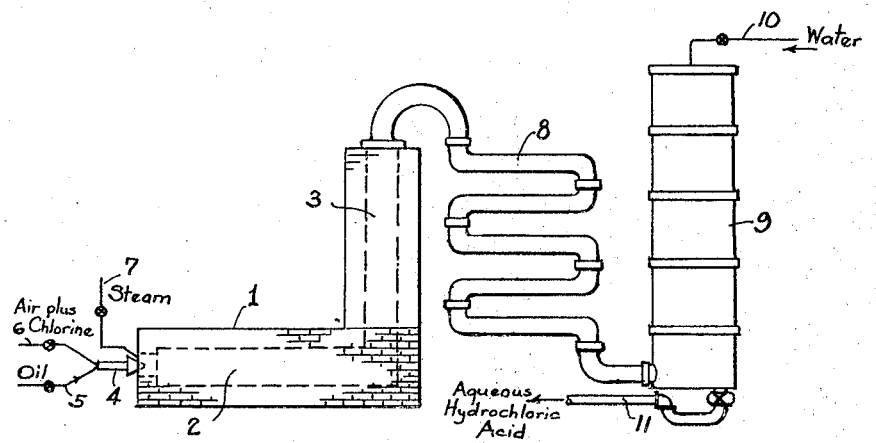
Figure 2:
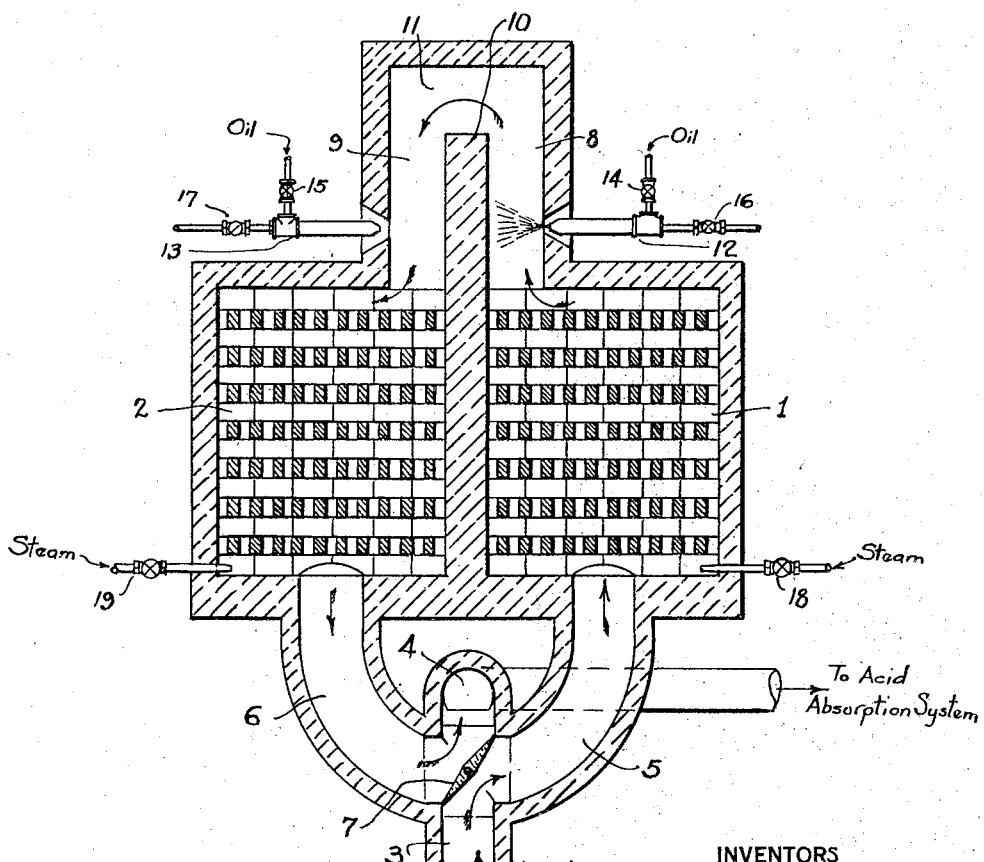

Fig. 1 illustrates diagrammatically one form of apparatus adapted to carrying out our new and improved process and Fig. 2 illustrates a modified form designed for the recovery of the heat in the reaction gases.

As a fuel suitable for use in the process we prefer a hydrocarbon material such as crude petroleum or the heavy fractions thereof known as "fuel oil", although we may also employ lighter hydrocarbon distillates or natural gas or mixtures of such materials. Chlorine may be admixed with the air required for the combustion of the oil, but particular advantage from the standpoint of cost is secured by utilizing for the purpose dilute chlorine gas mixtures which are obtained as by-product or waste product of various industrial processes, such dilute chlorine having but little economic value for most other purposes. The amount of water formed by the combustion of the fuel theoretically will be sufficient to combine with the chlorine introduced, but, as already stated, an excess of water is required in order to obtain a complete conversion of chlorine to hydrochloride acid. For example, when no additional water is used we have found that the exit gases always contain some free chlorine. With a reaction temperature as high as 1500° C. the maximum conversion obtained is only about 80 per cent, while by introducing an excess of water the conversion may be made practically quantitative at a lower temperature, e. g. around 1400° C. Such additional water may be injected as steam into the combustion zone, or may be premixed with the air, chlorine or fuel before the same enters the reaction. Obviously, also, all or a portion of such water vapor may be formed in situ during the reaction by the combustion of hydrogen introduced along with the gases entering the reaction. In such case air is to be supplied in sufficient volume to effect the combustion of both the fuel and hydrogen, and still leave an excess of oxygen in the exit gases.

Referring to the drawing, Fig. 1, 1 is a furnace including a combustion chamber 2, open at one end and connecting at the other with a flue 3. An oil burner 4 is located at the open end of chamber 2, and provided with connections 5 for fuel oil supply and 6 for air or steam and chlorine. A separate feed pipe 7 for introducing steam is also provided. Flue 3 leads to a cooler 8, which in turn is connected with the base of a scrubber tower 9. A water inlet 10 at the top of tower 9 and a trapped outlet 11 from the base thereof are provided as shown.

In operating the apparatus just described, oil or other suitable fuel is atomized in burner 4 by means of air or steam introduced thereto under pressure. The chlorine may be conveniently introduced already premixed with air, or, if preferred, it may be introduced separately through a supply pipe not shown. Steam may be injected into the combustion chamber through a separate pipe as shown. The atomized fuel is ignited and burnt in chamber 2, an excess of air being employed so as to insure complete combustion to carbon dioxide and water. The supply of fuel and air is maintained sufficient to raise the temperature of the exit gases preferably to from 1400° to 1500° C. When a sufficient excess of water vapor is present the conversion of chlorine becomes substantially quantitative at such temperature, and no free chlorine is found in the exit gases. The exit gases passing out through flue 3 consist of a mixture of hydrochloric acid, water vapor, carbon dioxide, oxygen and nitrogen. They are lowered in temperature in cooler 8 and then conducted to the base of the absorption tower 9, preferably filled with an acid proof packing material, wherein they pass upwardly in countercurrent to a stream of water or of an aqueous hydrochloric acid solution introduced into the top of the tower through inlet 10. The hydrochloric acid is dissolved and is collected as a solution thereof in the base of the tower, whence the solution is drawn off through trapped outlet 11. One or more such absorption towers may be provided, depending upon the conditions necessary for obtaining a complete absorption of the acid gas. If desired, the acid solution from the base of the tower may be recirculated over the tower until any desired strength of solution is produced.

As already stated the preferred reaction temperature is between 1400° and 1500° C., as such temperature has been found necessary to secure complete conversion of chlorine to hydrochloric acid. However, a substantial reaction occurs at temperatures as low as 900° to 1000° C., and, by recycling the exit gases, the process may be operated at such lower temperatures with a good yield of hydrochloric acid. In such case, however, free chlorine will be present in the exit gases and will also be dissolved in the absorbing liquid.

Fig. 2 illustrates a modified form of apparatus adapted to large scale continuous operation wherein the regenerative principle is employed for securing a greater economy of heat utilization. In said figure, 1 and 2 are chambers constructed of refractory material and provided interiorly with a checker work of fire brick or other suitable material arranged in the usual way. An inlet 3 for air and chlorine, and an exit passage 4 for reacted gases communicate with conduits 5 and 6, respectively, connecting with chambers 1 and 2. A reversing valve 7 located at the junction of the inlet and exit passages and connecting conduits provides for reversing the intercommunication therebetween, as shown. Passages 8 and 9 lead from the upper part of chambers 1 and 2, the lower portions thereof being separated from each other by means of baffle wall 10, above which the passages unite to form a combustion chamber 11. Oil burners 12 and 13 are directed into passages 8 and 9, respectively, through openings provided therefor, and are connected by means of valved pipes 14 and 15, respectively, with an oil supply and by pipes 16 and 17, respectively, for air or steam sufficient to atomize the oil. Steam may be admitted to chambers 1 and 2 by means of valved pipes 18 and 19, respectively.

In operating the apparatus just described in Fig. 2, a dilute chlorine gas, or mixture of air and chlorine, containing preferably from 2 to 10 per cent chlorine, is introduced through inlet 3 and conduit 5 into chamber 1, wherein it is preheated up to about 1200° to 1300° C., at least at the beginning of each cycle, by the heat stored in the checker work packing from a previous operation. The preheated gases pass thence into passage 8 and combustion chamber 11 wherein they are intimately mixed with the burning oil vapors introduced by burner 12, the volume of such preheated gases admitted being controlled so as to furnish an excess over the quantity of air required for the complete combustion of the oil. The temperature of the reacting gases in the combustion chamber is raised to about 1400° to 1500° C., the supplies of oil and air, respectively, being so regulated as to maintain the temperature within such limits. In order to provide the excess of water essential for a quantitative conversion, steam is conveniently introduced near the base of chamber 1 as shown in the drawing.

The hot reaction gases flow from combustion chamber 11 through passage 9 to chamber 2, wherein they give up a portion of their heat to the brick packing thereof and become cooled to about 600° F. The cooled gases then traverse conduit 6 leading to exit passage 4, which in turn conveys the gases directly to the scrubber tower or other device for absorbing the hydrochloric acid gas therefrom.

When the temperature of the incoming gases entering the combustion chamber has fallen to about 1000° C., valve 7 is reversed so that the air-chlorine mixture entering at 3 now passes upwardly through conduit 6 into chamber 2, wherein the heat stored in the brick packing raises the temperature of the gases entering the combustion chamber at 9 to about 1300° C. Oil burner 12 is turned off, and burner 13 is started, likewise steam inlet 18 is shut off, and steam admitted to chamber 2 at inlet 19, the further operation then continuing as before except that the direction of flow of the gases is reversed, the cooled gases finally passing out through conduit 5 to exit passage 4. Under continuous operation the direction of flow is reversed periodically at such intervals as to maintain an approximately stable temperature condition in the combustion chamber without increasing fuel consumption.

The heat regenerator chambers 1 and 2 and the combustion chamber are to be constructed of refractory material capable of withstanding high temperatures, and covered externally with heat insulating material. The inlet passage 3, outlet passage 4 and conduits 5 and 6 may likewise be constructed of refractory material, but are preferably made of iron or steel, which is not materially attacked by the reaction gases containing hydrochloric acid and water vapor if the temperature thereof is maintained between about 140° and 325° C. By introducing steam directly into regenerator chamber 1 or 2, all contact of a moist acid gas with metallic pipes or conduits is avoided, and no corrosion difficulties are encountered.

The following detailed examples are presented by way of illustration of our improved process, but it is understood that the invention is not limited to the specific conditions of temperature, concentration, quantities of materials, etc. therein set forth.

Example 1

In an apparatus similar to that shown in Fig. 1 of the drawing fuel oil was burnt with a chlorine-air mixture containing approximately 8.0 per cent chlorine. The temperature in the combustion chamber was maintained between 1150° and 1540° C. The quantity of oil consumed to maintain the temperature was .214 pounds oil per pound of chlorine introduced. An average analysis of the exit gases from the reaction was as follows:

|  | Per cent by volume |
|---|---|
| $CO_2$ | 8.62 |
| $O_2$ | 13.6 |
| $HCl$ | 12.8 |
| $Cl_2$ | 1.6 |

The total volume of exit gases was approximately 75 cubic feet per minute. The water content of the exit gases corresponded to about 39 per cent in excess of the quantity initially required to balance the equation;

$$2H_2O + 2Cl_2 \rightarrow 4HCl + O_2$$

Under the conditions of the experiment, with a maximum temperature of 1540° C., the conversion of $Cl_2$ to $HCl$ was 80 per cent.

Example 2

In this example the procedure was similar to that in Example 1, except that additional steam was introduced with the combustion gases sufficient to provide an excess of 200 per cent thereof over the amount theoretically required. The chlorine-air mixture contained 8.16 per cent chlorine, and oil consumption was .236 pounds per pound of chlorine, maintaining a reaction temperature between 1100° and 1430° C. The analysis of the exit gases on a dry basis was as follows:—

|  | Per cent by volume |
|---|---|
| $CO_2$ | 9.63 |
| $O_2$ | 11.7 |
| $HCl$ | 16.32 |
| $Cl_2$ | 0.0 |

The volume of exit gases was 75 cubic feet per minute calculated as at standard conditions. Conversion of $Cl_2$ to $HCl$ was 100 per cent.

The proportions of air, chlorine and steam in the reaction mixture may be varied between rather wide limits, but in general the air-chlorine mixture is preferably regulated to contain from 2 to 10 per cent chlorine, while sufficient steam is added to provide an excess of from 100 to 200 per cent above the theoretical quantity of water required for the reaction. The preferred temperature range within the combustion zone, as already stated, is between 1400° and 1500° C., although temperatures as low as 900° to 1000° C. may be employed. Higher temperatures than those above given afford no added advantage, and, if employed, may lead to excessive deterioration of apparatus. In practice the quantity of fuel oil, or its equivalent, employed is determined by the requirement for maintaining a favorable reaction temperature, and this in turn depends measurably upon the design and thermal efficiency of the apparatus. While in the examples given the oil consumption was slightly less than one quarter pound per pound of chlorine, by utilizing a more efficiently designed apparatus embodying means for conserving heat, as shown in Fig. 2, the oil consumption may be materially diminished below the figures given.

Other types of fuel may be utilized in place of fuel oil, such as crude oil, tar or lighter petroleum distillates, natural gas or artificial fuel gas, or powdered coal, without materially altering the mode of operation as already described. When a carbonaceous fuel containing little or no hydrogen is employed, a somewhat greater amount of steam will require to be added in order to compensate for the water vapor that would be formed if a hydrocarbon fuel were burnt.

The absorption and further utilization of the hydrochloric acid produced in the present process is not a part of this invention. The absorption may be carried out according to known methods employing water or aqueous hydrochloric acid solutions as the absorbing medium, and in any suitable type of apparatus. If desired, an alkaline absorbing medium, e. g. magnesium hydrate or milk of lime, may also be employed, whereby a solution of the corresponding chloride is produced. The hot acid gases leaving the reaction must be cooled, preferably by conducting them through flues or channels constructed of refractory siliceous material, such as fire brick or fused silica, before being brought in contact with metallic, glass or enamel surfaces, in order to avoid chemical attack of such surfaces, or cracking due to differences in expansion. When the regenerative principle of absorbing heat is employed, as shown in Fig. 2, such cooling of the gases is advantageously combined with exchange of heat between the incoming and outgoing gases, thereby promoting the thermal efficiency of the process.

In the following claims the expression "dispersed form" as applied to a carbonaceous fuel is intended to comprehend either a state of molecular dispersion, as in the case of a gaseous fuel, or a state of minute physical dispersion, as in the case of an atomized liquid fuel or of a powdered solid fuel.

Other modes of applying the principle of our invention may be employed instead of the one explained, change being made as regards the process herein disclosed, provided the step or steps stated by any of the following claims or the equivalent of such stated step by steps be employed.

We therefore particularly point out and distinctly claim as our invention:—

1. A process for the manufacture of hydrochloric acid which comprises burning a carbonaceous fuel in dispersed form with at least sufficient air for the complete combustion thereof and simultaneously introducing chlorine and water vapor into the combustion zone.

2. A process for the manufacture of hydrochloric acid which comprises reacting chlorine and water vapor in a heated zone maintained at a temperature between about 900° and 1500° C. by the combustion simultaneously therein of a carbonaceous fuel in dispersed form with at least sufficient air for the complete combustion thereof.

3. A process for the manufacture of hydrochloric acid which comprises introducing air, chlorine and water vapor into a heated reaction zone maintained at a temperature between 900° and 1500° C. by the combustion therein of a carbonaceous fuel in dispersed form with at least sufficient air for the complete combustion thereof and separating hydrochloric acid from the reacted gaseous mixture.

4. A process for the manufacture of hydrochloric acid which comprises introducing air, chlorine, water vapor and a carbonaceous fuel in dispersed form into a heated reaction zone maintained at a temperature between 900° and 1500° C., such air being in amount sufficient for complete combustion of such fuel, separating hydrochloric acid from the reacted gaseous mixture and preheating the gases entering the reaction by passing the same through a zone previously heated by contact with the hot reaction gases.

5. A process for the manufacture of hydrochloric acid which comprises burning a hydrocarbon with sufficient air for complete combustion thereof in the presence of chlorine and added water vapor.

6. A process for the manufacture of hydrochloric acid which comprises burning a hydrocarbon with sufficient air for complete combustion thereof in the presence of chlorine with addition of water vapor in amount sufficient to provide an excess thereof in the reaction zone over the quantity required to combine with all of the chlorine present.

7. A process for the manufacture of hydrochloric acid which comprises burning a hydrocarbon with sufficient air for the complete combustion thereof to form $CO_2$ and $H_2O$ and simultaneously introducing chlorine thereto in amount relative to the $H_2O$ present less than theoretically required to combine therewith in accordance with the equation

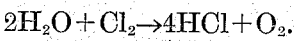
$$2H_2O + Cl_2 \rightarrow 4HCl + O_2.$$

8. A process for the manufacture of hydrochloric acid which comprises burning a hydrocarbon with air in sufficient amount for complete combustion thereof and simultaneously introducing chlorine and water vapor thereto.

9. A process for the manufacture of hydrochloric acid which comprises introducing air, chlorine, water vapor and a hydrocarbon into a heated reaction zone maintained at a temperature between 900° and 1500° C., such air being in amount sufficient for complete combustion of such hydrocarbon, and separating hydrochloric acid from the reacted gaseous mixture.

10. A process for the manufacture of hydrochloric acid which comprises introducing air, chlorine, water vapor and a hydrocarbon into a heated reaction zone maintained at a temperature between 900° and 1500° C., such air being in amount sufficient for complete combustion of such hydrocarbon, separating hydrochloric acid from the reacted gaseous mixture and preheating the gases entering the reaction by passing the same through a zone previously heated by contact with the hot reaction gases.

11. A process for the manufacture of hydrochloric acid which comprises introducing air, chlorine, water vapor and a hydrocarbon into a heated reaction zone maintained at a temperature above about 900° C., such air being in amount sufficient for complete combustion of such hydrocarbon, and separating hydrochloric acid from the reacted gaseous mixture.

12. A process for the manufacture of hydrochloric acid which comprises reacting chlorine with water vapor in excess of the amount thereof required according to the equation;

$$2H_2O + 2Cl_2 \rightarrow 4HCl + O_2$$

while maintaining the temperature within the reaction zone between about 900° and 1500° C. by the simultaneous combustion therein of a carbonaceous fuel in dispersed form with sufficient air for the complete oxidation thereof, and separating hydrochloric acid from the reaction product.

13. A process for the manufacture of hydrochloric acid which comprises reacting chlorine with water vapor in excess of the amount thereof required according to the equation;

$$2H_2O + 2Cl_2 \rightarrow 4HCl + O_2$$

while maintaining the temperature within the reaction zone between about 900° and 1500° C. by the simultaneous combustion therein under oxidizing conditions of a hydrocarbon fuel, and separating hydrochloric acid from the reaction product.

14. A process for the manufacture of hydrochloric acid which comprises reacting chlorine with water vapor in excess of the amount thereof required according to the equation;

$$2H_2O + 2Cl_2 \rightarrow 4HCl + O_2$$

while maintaining the temperature within the reaction zone between about 900° and 1500° C. by the simultaneous combustion therein under oxidizing conditions of a hydrocarbon fuel, preheating the gases and vapors entering the reaction by passing the same through a zone previously heated by contact with the hot reaction gases and separating hydrochloric acid from the reaction product.

15. A process for the manufacture of hydrochloric acid which comprises burning a combustible gas containing carbon compounds and hydrogen with sufficient air for the complete combustion thereof, simultaneously introducing chlorine and water vapor into the combustion zone and separating hydrochloric acid from the gaseous reaction product.

16. A process for the manufacture of hydrochloric acid which comprises burning a hydrocarbon oil with sufficient air for the complete combustion thereof, simultaneously introducing chlorine and water vapor into the combustion zone and separating hydrochloric acid from the gaseous reaction product.

Signed by us this 1st day of October 1929.
EDWIN O. BARSTOW.
SHELDON B. HEATH.